UNITED STATES PATENT OFFICE.

OSWALD HENTSCHEL, OF GRIMMA, GERMANY, ASSIGNOR TO ALOIS ZECKENDORF, OF CINCINNATI, OHIO.

PROCESS OF BLEACHING AND CONSERVING YEAST.

1,056,540. Specification of Letters Patent. Patented Mar. 18, 1913.

No Drawing. Application filed October 27, 1911. Serial No. 657,123.

*To all whom it may concern:*

Be it known that I, OSWALD HENTSCHEL, a subject of the King of Saxony, and a resident of Grimma, Saxony, Germany, have invented certain new and useful Improvements in Processes of Bleaching and Conserving Yeast, of which the following is a specification.

The invention relates to a process for conserving yeast.

For the purpose of producing yeast which can be kept without spoiling, the water must be abstracted therefrom. This drying process heretofore occasioned considerable difficulty, because when carried out at a low temperature, it occupied so much time that the yeast became decomposed, and, consequently, soft, sticky and bad smelling, while when carried out at a high temperature the process although indeed quicker, resulted in the yeast losing much—about 50%—of its leavening property. By drying in a vacuum better results were also not obtained, because in order to maintain the leavening property of the yeast only low temperatures could be employed, and, as a consequence, the drying process still required considerable time and the yeast assumed an unpleasant cheeselike smell.

The invention consists in treating the yeast before commencing, or during, the drying process with ozone. By this treatment the decomposition of the yeast is prevented and all disagreeable smell removed, so that the drying process can take place slowly, thus at a low temperature. Of course yeast treated with ozone can be dried in a vacuum with the same success. This treatment has the further advantage that the yeast is bleached and consequently improved in appearance. The process is either carried out by the yeast being previously washed with water containing ozone, or by its being brought into contact with ozone, either previous to, or during, the drying process.

What I claim and desire to secure by Letters Patent of the United States is:

The process of bleaching and conserving yeast, which consists in subjecting the yeast to the action of ozone and to a drying operation.

In testimony, that I claim the foregoing as my invention, I have signed my name in presence of two subscribing witnesses.

OSWALD HENTSCHEL.

Witnesses:
ERICH HENTSCHEL,
RUDOLPH FRICKE.